Patented Sept. 8, 1942

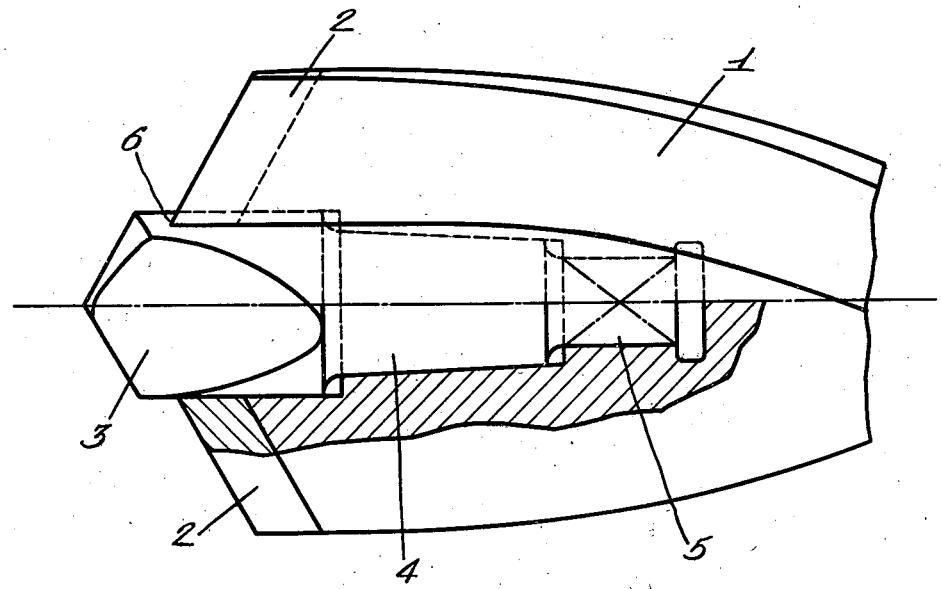
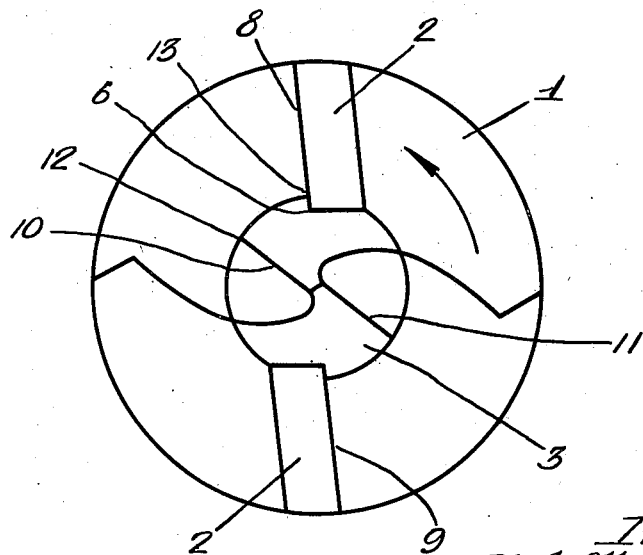

2,294,969

UNITED STATES PATENT OFFICE 2,294,969

ROTATABLE CHIP-CUTTING TOOL

Karl Albert Engvall and Erik Gisslén, Goteborg, Sweden

Application September 11, 1941, Serial No. 410,462
In Sweden March 8, 1940

1 Claim. (Cl. 77—65)

The present invention refers to such chip cutting tools, for instance drills, cutters or the like, in which the chip removal takes place by relative rotation between the tool and the work piece and the simultaneous feeding of either in the direction along the axis of rotation. In the following the invention will be described as applied to a drill.

When drilling, the depth drilled per unit of time is equal to the product of the feed per revolution of the drill and the number of revolutions per unit of time. The latter is however limited by the maximum peripheral velocity which is permissible with the material which forms the cutting edges and the material in which the drilling takes place. The drill speed can therefore be increased by the use of cutting metals which allow a greater cutting speed. While this maximum speed with a drill of carbon steel when drilling in certain kinds of steel is limited to about 35 ft. per minute, high-speed steel tools may attain 90 ft. per minute, whilst cutting edges made of hard alloy metals, for instance certain carbides, such as tungsten carbides, can endure speeds of up to 300 to 330 ft. per minute. Tools of this kind are therefore as regards cutting capacity very superior to others, but on the other hand carbides are very brittle and therefore very sensitive to high pressures. The pressure against a drill is always greatest at the point of the drill, and for this reason in order to fully make use of the high cutting capacity of the carbides it is usual to first drill the work with a smaller drill in order to relieve the pressure at the point of the drill. The disadvantage of this method is of course that it requires an extra operation for each hole drilled.

This extra drilling operation can be avoided and the superior cutting capacity of the carbides can be fully utilized by making use of a combined tool in which the inner edges, i. e. the edges located nearest to the axis of rotation of the tool are formed of a material with relatively great resistance to pressure, such as high-speed steel, or the like, while the outer edges, which are located farther from the axis of rotation, are formed of a material especially suitable for cutting at higher speeds, for instance hard metal alloys, such as tungsten carbides and certain other carbides.

A tool of this kind cannot however function satisfactorily if the hard metal alloy cutting edges have corners forming acute angles which are subjected to high pressure. The present invention has therefore for its object to provide a tool in which such corners are protected against pressure, and is characterized mainly thereby that the hard metal alloy cutting edges extend inwardly to a radius which is less than the greatest radius of the high-speed steel cutting edges and are recessed into the inner drill member behind the cutting edges of the inner member in the direction of rotation.

An embodiment of the invention as applied to a drill is illustrated on the accompanying drawing in which Fig. 1 shows partly in section a view of the forward end of a drill as seen from the side. Fig. 2 shows an end view of the same drill seen from the point.

In the form illustrated, the numeral 1 designates a drill of suitable material which is provided with a cutting edge 2 of hard metal alloy, such as tungsten carbide, or the like, fixed thereto in any suitable known manner. At the forward end of the drill a smaller drill 3 is fixed concentric with the axis of the larger drill 1. This smaller drill may be made of any suitable material which is not too sensitive to pressure, for instance high-speed steel. The drill 3 can be provided with a cone 4 fitting into a tapering hole in the main drill and may also be provided with a square end 5 fitting a square hole in the main drill for transmitting rotation to the drill 3 when drilling. Preferably the drill 3 projects past the edges 2 of the main drill in order to better guide the drill during the working operation.

The diameters of the drills 1 and 3 respectively are preferably chosen so that the properties of the material of which they are made are fully utilized. If $d$ is the diameter of the drill 3, and $D$ is the diameter of the drill 1, and further if $v$ designates the maximum speed at which the material, of which the cutting edges of the drill 3 are formed, can work and $V$ the corresponding speed of the material in the cutting edges 2, then the ratio $d:D$ should preferably not exceed ratio $v:V$ but may suitably be made about this value.

Hard metal alloys, such as carbides, are exceedingly sensitive to pressures against sharp corners. The corner 6, that is the inner corner of the cutting edge 2, forms an angle of less than 90° and is therefore a weak point. In order to protect this corner the hard metal alloy edges 8 and 9 are displaced relative to the edges 10 and 11 of the high-speed steel center drill in such a manner that they are located behind the latter edges in the direction of rotation (shown with the arrow in Fig. 2) when drilling. The cutting edges 2 can therefore be extended inwardly nearer to the center of the drill than the distance to the corners 12 on the center drill, whereby the corners 6 will be entirely freed from drilling work and pressure.

The invention is naturally not limited to the form illustrated, but a number of modifications can be made without departing from the spirit thereof. For instance the method of fixing the center drill 3 may be varied. Among other things the square 5 may be dispensed with and the drill 3 rotated only by the shoulders 13 on the center drill which engages with co-acting surfaces in the main drill 1.

Having now particularly described and ascertained the nature of our invention and in what manner the same is to be performed, we declare that what we claim is:

A rotatable chip cutting tool comprising an outer member of greater diameter and an inner member of less diameter fixed to the outer member coaxially therewith and at the forward end thereof, the said inner member having cutting edges of high-speed steel, there being cutting edges of hard metal alloy at the forward end of the outer member, the said hard metal alloy edges extending inwardly to a radius which is less than the greatest radius of the cutting edges of the inner member and being recessed into the inner member behind the cutting edges of the inner member in the direction of rotation of the tool.

KARL ALBERT ENGVALL.
ERIK GISSLÉN.